(12) United States Patent
Gandhi et al.

(10) Patent No.: US 12,501,469 B2
(45) Date of Patent: Dec. 16, 2025

(54) PEER-TO-PEER COMMUNICATION IN WI-FI NETWORKS IN PRESENCE OF INTERFERENCE

(71) Applicant: Cisco Technology, Inc., San Jose, CA (US)

(72) Inventors: Indermeet S. Gandhi, San Jose, CA (US); Jerome Henry, Pittsboro, NC (US); Robert E. Barton, Richmond (CA); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 18/361,601

(22) Filed: Jul. 28, 2023

(65) Prior Publication Data

US 2024/0381402 A1  Nov. 14, 2024

Related U.S. Application Data (60) Provisional application No. 63/501,976, filed on May 12, 2023, provisional application No. 63/501,649, filed on May 11, 2023.

(51) Int. Cl.
| | |
|---|---|
| *H04W 72/0453* | (2023.01) |
| *H04W 72/40* | (2023.01) |
| *H04W 72/541* | (2023.01) |
| *H04W 84/12* | (2009.01) |
| *H04W 88/06* | (2009.01) |

(52) U.S. Cl.
CPC ..... *H04W 72/541* (2023.01); *H04W 72/0453* (2013.01); *H04W 72/40* (2023.01); *H04W 84/12* (2013.01); *H04W 88/06* (2013.01)

(58) Field of Classification Search
CPC .......................... H04W 72/0453; H04W 72/40
USPC .......................................................... 370/329
See application file for complete search history.

(56) References Cited

U.S. PATENT DOCUMENTS

| | | |
|---|---|---|
| 2018/0262233 A1 | 9/2018 | Laselva et al. |
| 2018/0295637 A1 | 10/2018 | Manolakos et al. |
| 2020/0077409 A1 | 3/2020 | Jiang et al. |
| 2020/0288324 A1 | 9/2020 | Ford et al. |

(Continued)

OTHER PUBLICATIONS

Khorov E., et al., "Current Status and Directions of IEEE 802.11be, the Future Wi-Fi 7", IEEE Access, May 8, 2020, vol. 8, pp. 88664-88688, DOI: 10.1109/ACCESS.2020.2993448.

(Continued)

*Primary Examiner* — Angel T Brockman
(74) *Attorney, Agent, or Firm* — Patterson + Sheridan, LLP (57) ABSTRACT

Disclosed are a system and method for avoiding interference in direct communication between peers in a Wi-Fi network. A station (STA) desiring to communicate directly with another STA reports a change in interference to a function that determines a set of unsafe frequencies caused by interference near the STA. The function sends a report containing the set of unsafe frequencies to the AP for the STA. The AP then evaluates the severity of the interference and selects a set of RUs that are suitable for a TXOP for direct communication between the STA and another STA. The AP informs the STAs of the selected set of RUs, and the STAs communicate with each other using the selected RUs. If allowed, the STA sends feedback regarding the success of the communication to the AP.

20 Claims, 8 Drawing Sheets

(56) References Cited

U.S. PATENT DOCUMENTS

2022/0256352 A1    8/2022   Vaidya et al.
2022/0312513 A1    9/2022   Chitrakar et al.

OTHER PUBLICATIONS

Ni: "Introduction to 802.11ax High-Efficiency Wireless", Semiconductor Solutions, Retrieved on May 22, 2023, 27 Pages.

Nin C.S., "Why 5G NR-U is such an 'Important Chapter' in Cellular Connectivity", 5G Network Infrastructure Spectrum, Jun. 17, 2020, 12 Pages.

Wikipedia: "Wi-Fi 6", The Free Encyclopedia, retrieved May 22, 2023, 11 Pages.

Baron S (Canon)., et al., "Triggered P2P Transmissions Follow Up", IEEE Draft, 11-20-0813-07-00BE-Triggered-P2P-Transmiss Ions-Follow-Up, IEEE-SA Mentor, Piscataway, NJ USA, vol. 802.11 EHT, 802.11be, No. 7, Aug. 31, 2020, pp. 1-18, XP068172429, Retrieved from https://mentor.ieee.org/802.11/dcn/20/11-20-0813-07-00be-triggered-p2p-transmissions-follow-up.pptx on Sep. 1, 2020, p. 4-p. 8.

International Search Report and Written Opinion for International Application No. PCT/US2024/027008, mailed Jul. 25, 2024, 15 Pages.

Schelstraete S (Maxlinear): "TGbe Coexistence Assessment Document", IEEE Draft, 11-21-0706-07-00BE-TGBE-Coexistence-Assess Ment-Document, IEEE-SA Mentor, Piscataway, NJ USA, vol. 802.11 EHT, 802.11be, No. 7, Sep. 8, 2022, 7 Pages, XP068194003, Retrieved from https://mentor.ieee.org/802.11/dcn/21/11-21-0706-07-00be-tgbe-coexistence-assessment-document.docx on Sep. 14, 2022, The Whole Document.

PEER-TO-PEER COMMUNICATION IN WI-FI NETWORKS IN PRESENCE OF INTERFERENCE

CROSS-REFERENCE TO RELATED APPLICATIONS

This application claims the benefit of U.S. provisional patent application Ser. No. 63/501,649 filed May 11, 2023, and U.S. provisional patent application Ser. No. 63/501,976 filed May 12, 2023. The aforementioned related patent applications are herein incorporated by reference in their entirety.

TECHNICAL FIELD

Embodiments presented in this disclosure generally relate to communication in a Wi-Fi network. More specifically, embodiments disclosed herein relate to avoiding interference in peer-to-peer (P2P) communications of the Wi-Fi network.

BACKGROUND

In P2P Wi-Fi communication, it is essential to have reliable and high-quality connections between stations (STAs). However, the emergence of an unlicensed band in 5G new radio (NR-U) cellular technology has resulted in interference, mainly when dual-capability STAs are involved, where one antenna transmits an NR-U signal while the other receives a Wi-Fi signal. While the access point (AP) serving the STAs can sometimes detect the presence of interfering technology, the Wi-Fi infrastructure is typically unaware of cellular transmission causing interference at the STA. Users can choose to turn off the cellular radio connection to reduce interference, but this is not practical as it is difficult to determine when to turn the cellular radio connection back on.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method for managing interference in a Wi-Fi network. The method includes evaluating at an access point a severity of detected interference based on a report by at least one station regarding detected interference on a channel of the Wi-Fi network; and determining, based on the severity of the detected interference, a set of resource units (RUs) to allocate to a transmission opportunity (TXOP) for peer-to-peer (P2P) communication between a first station and a second station, where the set of RUs are those that avoid the detected interference for the allocated TXOP.

Another embodiment presented in this disclosure is an AP configured to manage interference in a Wi-Fi network. The access point includes a processor and a memory coupled to the processor and having loaded therein a program. The program is designed to: evaluate a severity of the interference based on the report by at least one station regarding detected interference on a channel of the Wi-Fi network, determine, based on the severity of the detected interference, a set of resource units (RUs) to allocate to a transmission opportunity (TXOP) for peer-to-peer (P2P) communication between a first station and a second station, where the set of RUs are those that avoid the detected interference for the allocated TXOP.

Yet another embodiment presented in this disclosure is a non-transitory computer-readable medium encoding instructions, which, when executed by a processor of an access point coupled to a wireless medium, cause the access point to evaluate at the access point a severity of detected interference based on a report by at least one station regarding detected interference on a channel of the Wi-Fi network, and determine, based on the severity of the detected interference, a set of resource units (RUs) to allocate to a transmission opportunity (TXOP) for peer-to-peer (P2P) communication between a first station and a second station, where the set of RUs are those that avoid the detected interference for the allocated TXOP.

Example Embodiments

Wireless communication, according to the 802.11ax (aka Wi-Fi 6) standard, occurs by orthogonal frequency division multiple access (OFDMA), which allows allocating small but the most efficient portions of time-frequency resources called resource units (RUs) to STAs.

Wireless communication in the next generation standard, Wi-Fi 802.11be (aka EHT or Wi-Fi 7), improves on Wi-Fi 6, which uses 1024-QAM. Instead, Wi-Fi 7 employs 4096-QAM, along with multi-link operation (MLO), up to 16 spatial streams, multiuser, multiple input and output operation (MU-MIMO), and operates in the 2.4, 5, and 6 GHz frequency bands. Another feature is direct communication between STAs instead communication among STAs via the AP. This direct (aka P2P) communication is more efficient when the STAs are within the transmission range of each other. However, depending on the position of the STAs, P2P communication may encounter interference that is not detectable by the AP.

If a STA fails to receive the required TXOP due to interference, it may avoid requesting it, resort to TXOP retries, or other methods that further deteriorate the performance of the Wi-Fi communication.

Figure 1:
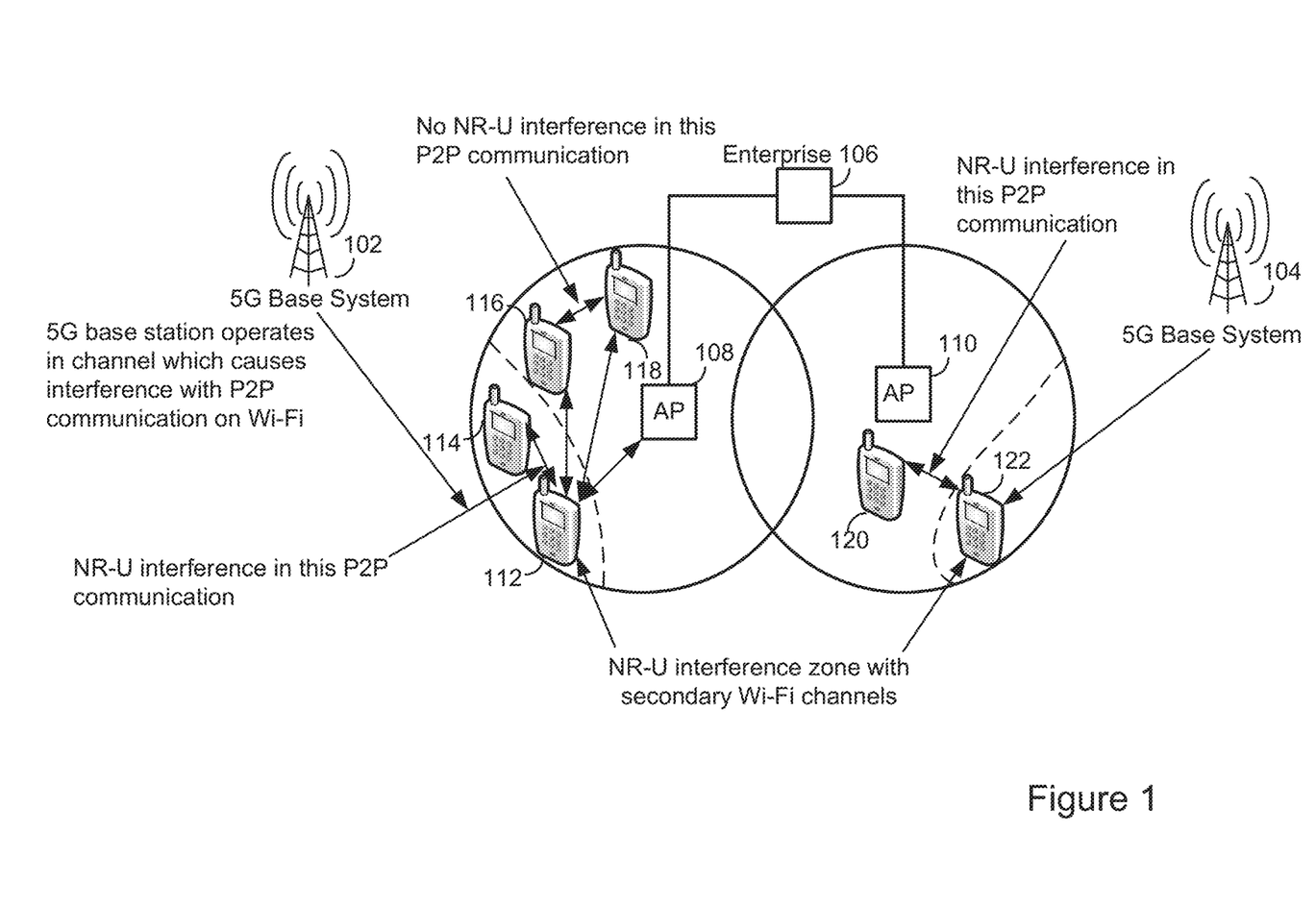
FIG. 1 depicts fifth-generation (5G) cellular technology and interference with Wi-Fi channels.

FIG. 1 depicts interference between Wi-Fi channels caused by 5G cellular technology. 5G-NR (new radio) cellular technology, as depicted by 5G base systems 102, 104, is an evolution of LTE, which was the dominant cellular standard after 2010. The 5G core network is similar to the core network of LTE but provides network slicing, control plane-user plane split, and support for service-based architectures. The radio access network (RAN) also has a similar structure to that of LTE. The RAN includes a central unit (CU) and distributed units, which handle the MAC and PHY layers.

5G-NR currently defines two frequency ranges, FR1 and FR2. FR1 is a range<6 GHz (cm wave), and FR2 covers 24.25-52.6 GHz (mm-wave). NR distinguishes between logical, transport, and physical channels for the downlink (DL) and uplink (UL).

Carrier aggregation, which enables an increase in bandwidth, is allowed in 5G-NR. Carrier aggregation includes continuous in-band, non-continuous, and inter-band aggregation.

5G-NR also allows for stand-alone operation in unlicensed bands where all signals must be carried in the unlicensed band. One unlicensed band, 6-7 GHz, is more commonly used and lands within bands used by Wi-Fi 6E.

As mentioned, one of the new benefits of Wi-Fi 7 is the capability of an AP to allocate a TXOP to support P2P communication by STAs. However, the effectiveness of this allocation can be compromised by the lack of visibility in the neighboring 5G NR-U channels, which can cause communication failures between STAs and costly retries of the communication or resort to Carrier Sense (CS)/Clear Channel Assessment (CCA), which can further deteriorate the overall wireless experience in the cell.

In FIG. 1, STAs 1, 2, 3, 4 (112, 114, 116, 118) are in the service of AP 108, and STAs 5, 6 (120, 122) are in the service of AP 110. APs 108 and 110 are accessible via enterprise node 106.

As depicted, a cellular system transmission by 5G-NR in the unlicensed bands causes interference with P2P communications in a Wi-Fi 7 network. Specifically, STAs 1, 2 (112, 114) are within the range of 5G base system 102 and thus experience NR-U interference when attempting to communicate directly with each other, while AP 108 is not within the range of the 5G base system 102 and thus does not detect the NR-U interference.

In addition, if STA 1 112 attempts to communicate with other STAs 3, 4 (116, 118), the communication experiences NR-U interference because STA 1 112 is within the range of the 5G base system 102.

Similarly, STA 5 122 is within the range of 5G base system 104 and thus also experiences NR-U interference when attempting to communicate with STA 6 120. However, as depicted, AP 110 does not detect the NR-U interference affecting STA 122.

Figure 2:
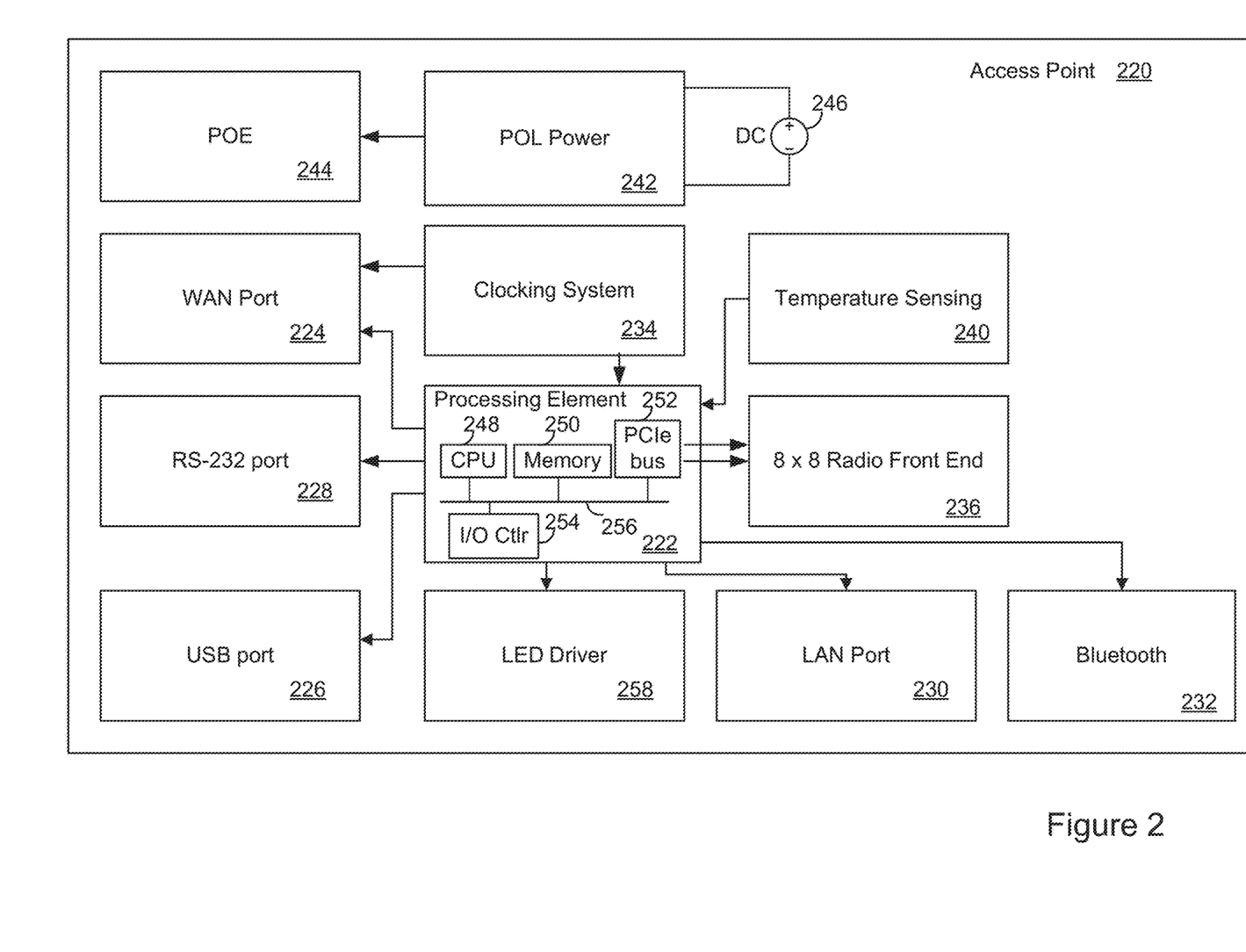
FIG. 2 depicts a representative AP.

FIG. 2 depicts a representative architecture of an AP. The AP 220 includes a processing element 222 and several ports or connection facilities, such as a WAN port 224, USB port 226, RS-232 port 228, LAN port 230, and Bluetooth 232. Also included are a clocking system 234 and an 8×8 radio front-end 236 with a transmitter and receiver, which are coupled to eight external antennas. Auxiliary modules include a temperature sensing module 240, a power module 242 connected to a DC power source 246, a power over Ethernet (POE) module 244, and LED driver 258. Processing element 222 includes a CPU 248 and memory 250, a peripheral control interconnect express (PCIe) bus controller 252 for connecting to the 8×8 radio front-end 236, and an I/O controller 254, all coupled to each other via bus 256. In embodiments, AP 200 is representative of AP 108 and AP 110.

Figure 3A:
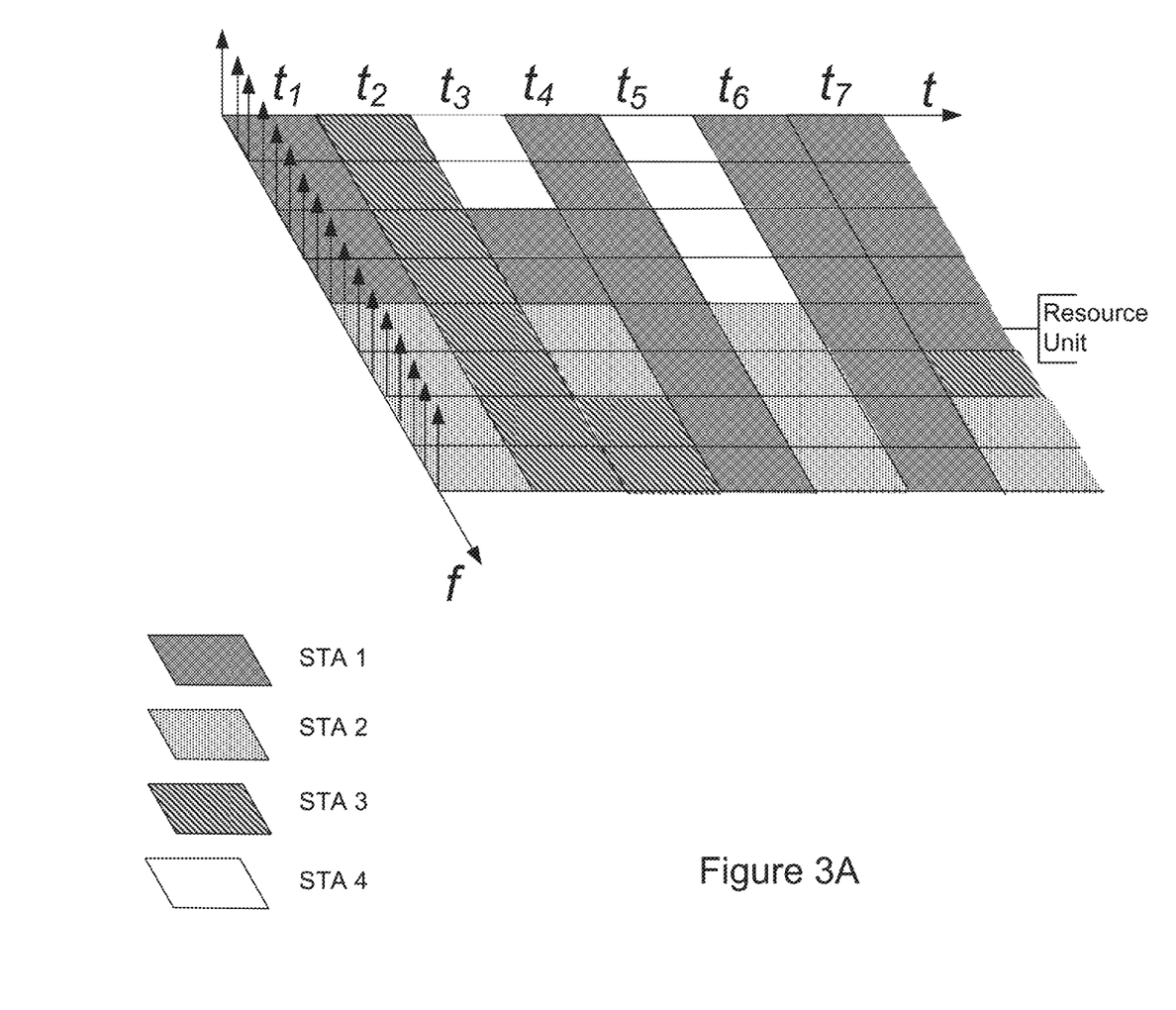
FIG. 3A depicts a resource unit (RU) allocation among four stations.

FIG. 3A depicts an RU allocation among four stations. In OFDMA, subcarriers of a basic service set (BSS) channel are divided into multiple groups. The groups, called resource units (RUs), can be allocated to different STAs at different times, depending on the conditions, service requirements, and hardware capabilities of the channels. According to the example in the figure, during time $t_1$, STA 1 and STA 2 are allocated 4 RUs each. During time $t_2$, STA 3 is allocated 8 RUs. During time $t_3$, STAs 1-4 are each allocated 2 RUs. During time $t_4$, STA 1 is allocated 8 RUs. During time $t_5$, STAs 2 and 4 are each allocated 4 RUs. During time $t_6$, STA1 is allocated 8 RUs; during time $t_7$, STA 1 is allocated 5 RUs; STA 3 is allocated 1 RU; STA 2 is allocated 2 RUs.

In 802.11 ax, the AP can assign RUs to different STAs for downlink (DL) or uplink (UL) transmission. An RU can contain 26, 52, 106, 242, 484, 996, or 2×996 subchannels or tones. However, an 802.11ax AP can assign each STA only a single RU. An 802.11 be AP supports the assignment of multiple RUs per STA.

Assignment of RUs to a STA occurs according to a special MAC layer frame sent by the AP, described below.

Figure 3B:
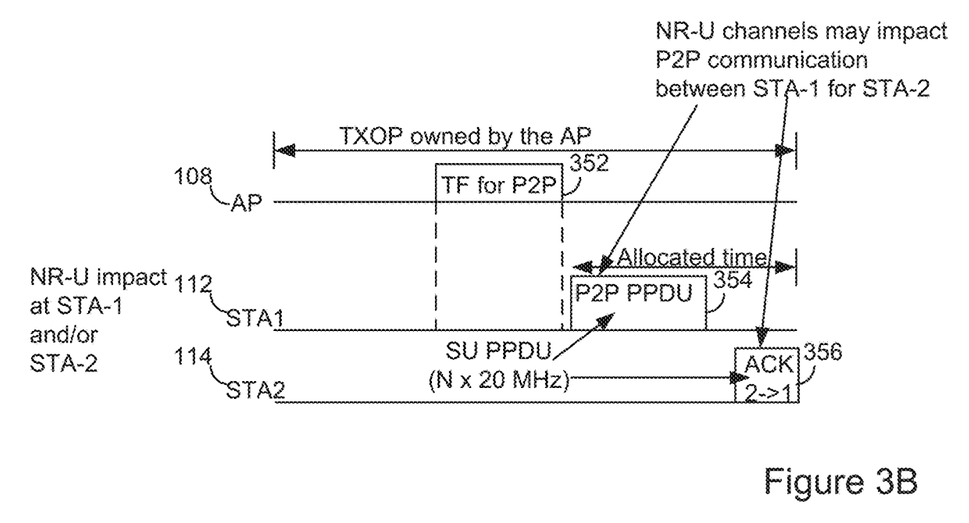
FIG. 3B depicts medium access layer (MAC) layer packets for a P2P physical protocol data unit (PPDU) between STA 1 and STA 2.

FIG. 3B depicts MAC layer packets for a P2P PPDU between STA 1 and STA 2. In the figure, AP 108 sends a trigger frame 352 to STA 1 and STA 2 to hand over a part of the TXOP (depicted as the allocated time) for communication between STA 1 and STA 2 (TXOP sharing mode 2). STA 1 then communicates with STA 2 via PPDU 354, after which STA 2 returns an ACK 356. The NR-U interference may impact the PPDU between STA 1 and STA 2.

Figure 3C:
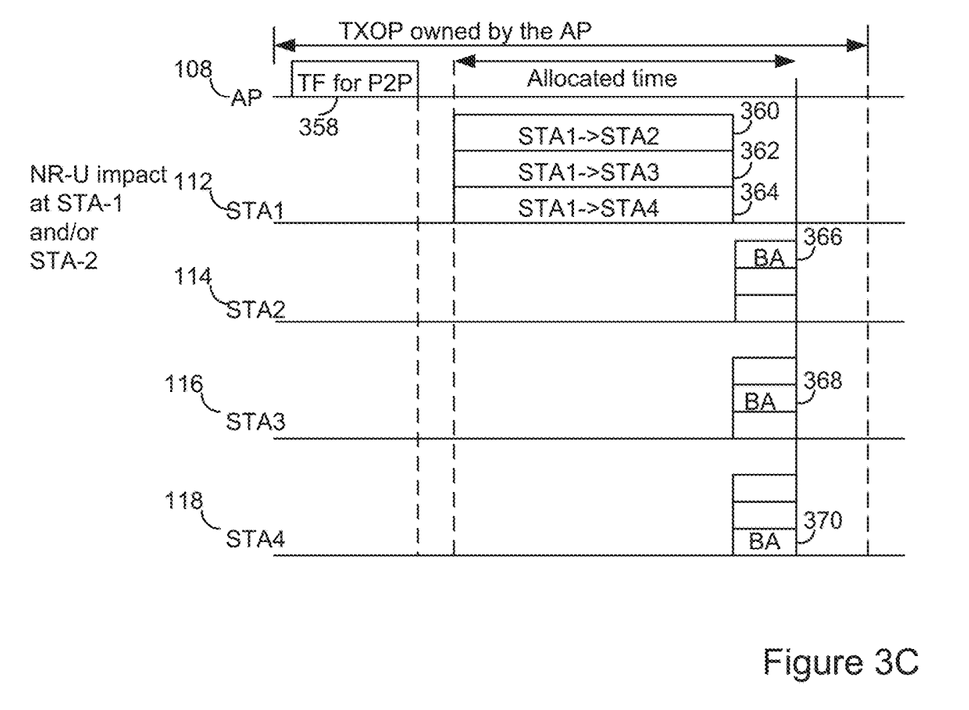
FIG. 3C depicts MAC-layer packets for P2P communication between STA 1 and STAs 2, 3, and 4.

FIG. 3C depicts MAC layer packets for P2P communication between STA 1 and STAs 2, 3, and 4. In the figure, AP 108 sends a trigger frame 358 to allocate a portion of a TXOP (depicted as the allocated time) for communication between STA 1 112 and STA 2 114, STA 3 116, and STA 4 118, as also depicted in FIG. 1. STA 1 112 then sends a communication 360 to STA 2 114, a communication 362 to STA 3 116, and a communication 364 to STA 4 118. STA 2 114, STA 3 116, and STA 4 118 each respond with a block acknowledge 366, 368, and 370, respectively. NR-U interference may impact the portion of the TXOP between STA 1 112 and STA 2 114, STA 3, 116, and STA 4 118.

Figure 3D:
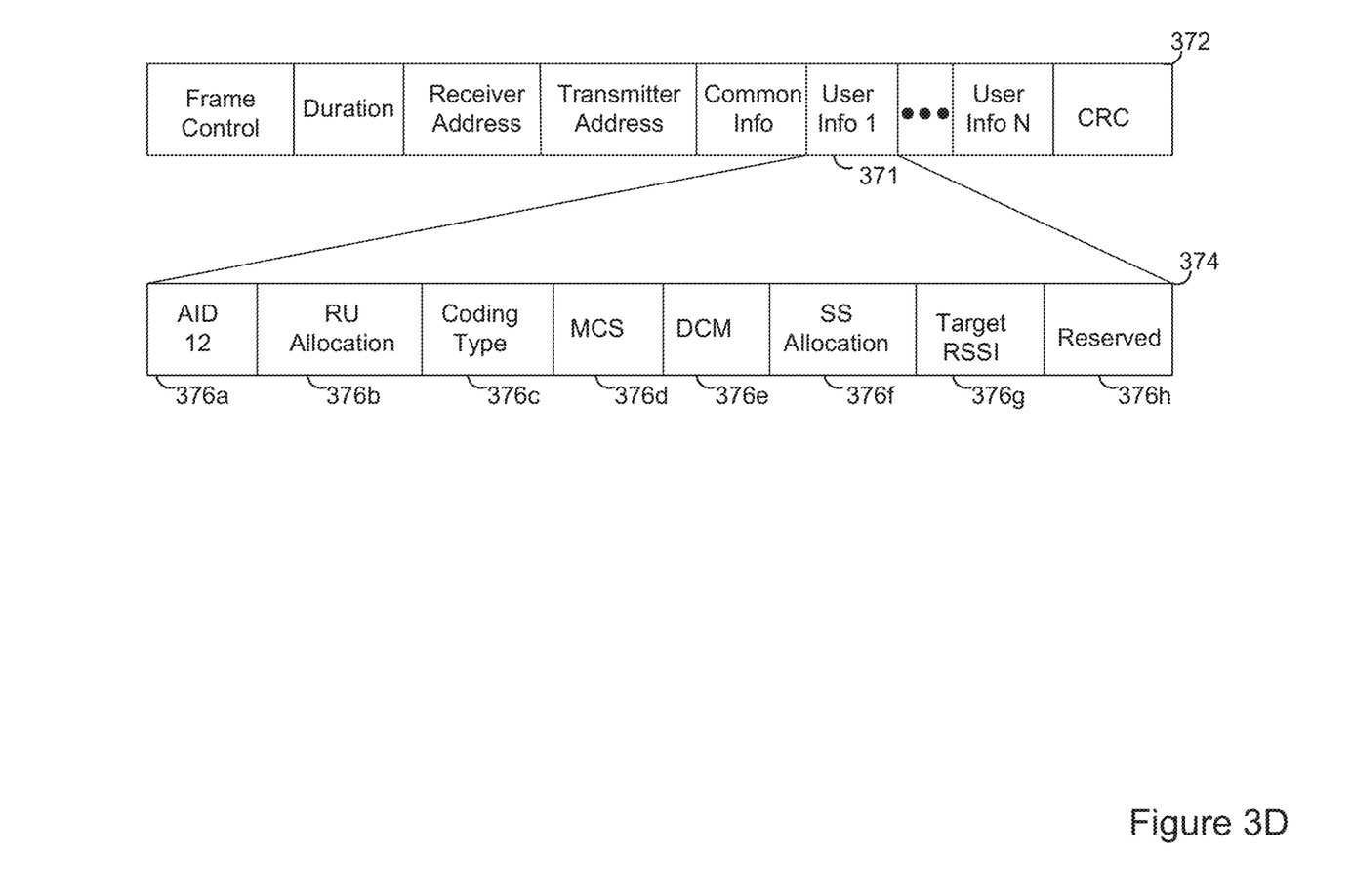
FIG. 3D depicts a trigger and user info frame for making RU allocations.

FIG. 3D depicts trigger and user info frames for making RU allocations to STAs. In each User Info frame 374, AID12 bits 376a set the least significant 12 bits of the identification number of the STA for which the user info field 371 in the trigger frame 372 is intended. The RU allocation bits 376b of the user info frame 374 set the RU allocation (time slots and frequency subcarriers) used by the triggered frame. The Coding Type 376c sets the channel coding (block or low-density parity-check (LDPC)) of the triggered frame. The MCS bits 376d set the triggered frame's modulation and Coding Scheme (MCS). The DCM bit 376e sets the triggered frame's dual carrier modulation (DCM). The SS Allocation bits 376f set the triggered frame's spatial streams (SS). The Target RSSI bits 376g, following which are reserved bits 376h, set the target received signal power (RSSI) of the triggered frame.

Figure 4:
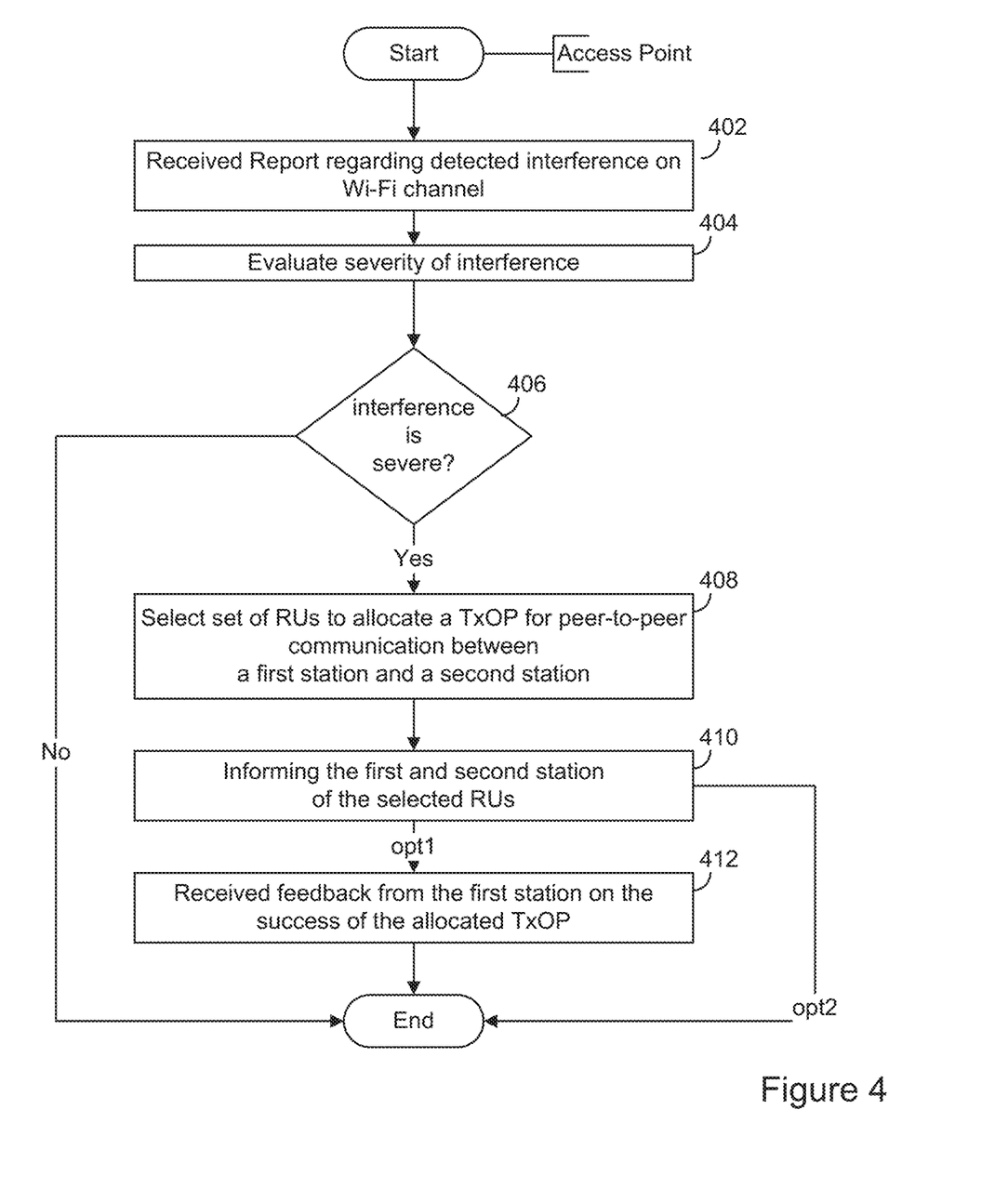
FIG. 4 depicts a flow of operations for an AP, in an embodiment.

FIG. 4 depicts a flow of operations for an AP according to an embodiment. In block 402, the AP receives a report regarding detected interference on a Wi-Fi channel from at least one of the STAs, which interference may not be detectable by the AP. In one embodiment, the AP collects the interference report from some or all peer STAs involved in P2P communication. In one embodiment, the cause of the interference is 5G or 6G NR-U operation on the channel, which overlaps with some of the secondary Wi-Fi Channels operating on the Wi-Fi AP. Such interference may occur when the cellular and Wi-Fi channels are adjacent (i.e., neighboring channels) or harmonic and inter-modulation product interference. In other embodiments, the cause of interference may be another type of radio transmission, such as radar.

The report contains a set of unsafe frequencies for P2P communication in use at the STA (for some/all target peer STAs). The set may include a segment of the AP's active channels (i.e., to which the client is associated) or a list of the AP's other channels (other radio on the same AP).

In block 404, the AP evaluates the severity of the interference reported (expressed in the report) and then uses this information to decide whether to allocate a set of safe RUs to the STA for a P2P TXOP.

In block 406, the AP determines whether the interference is severe enough to warrant a change in RU assignment.

In block 408, if the interference is severe enough, the AP uses knowledge of the affected channels in the TXOP allocation to select a set of RUs not impacted by NR-U interference for P2P communication between the first and second STAs. For RUs that overlap with NR-U channels, the AP can allocate those RUs to other STAs where the NR-U is not impacting regular TXOPs or Mode 2 TXOPs.

In another embodiment, P2P STAs may also move to another area of coverage of the same AP or to another AP. The procedure described above is repeated, and a feedback mechanism is used to provide the interference levels for the allocated RUs for optimal RUs assignment during STA movement or upon change detected in NR-U operating channels.

In block 410, the AP informs the first and second STAs of the selected set of RUs for the TXOP.

In block 412, if capable, the AP receives feedback from the first STA on the success of the RUs for the TXOP.

Figure 5:
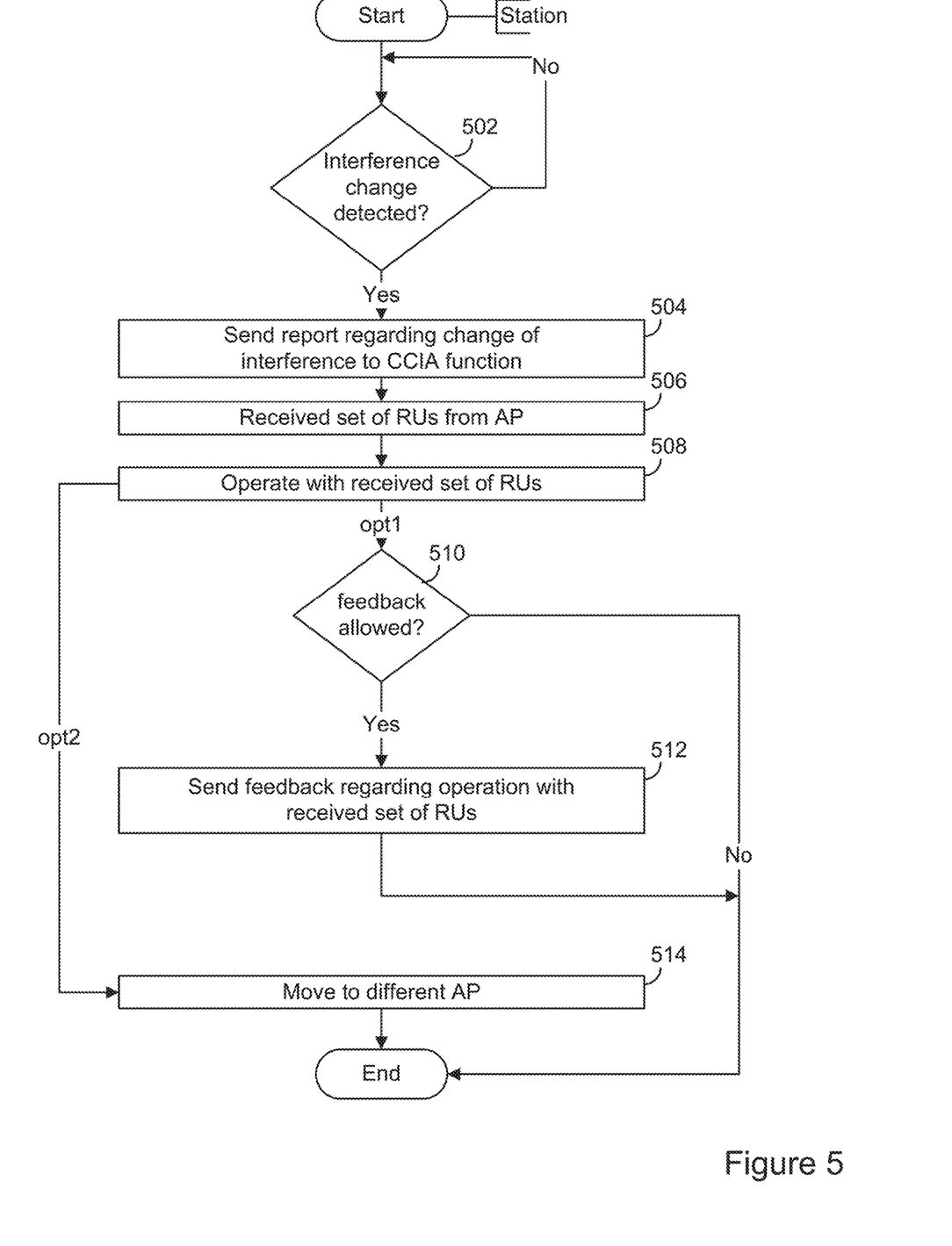
FIG. 5 depicts a flow of operations for a STA that participates in a P2P communication, in an embodiment.

FIG. 5 depicts a flow of operations for a STA that participates in a P2P communication, in an embodiment.

In block 502, when the Wi-Fi STA is connected to an AP which is operating in an overlapping channel, or the Cellular Base STA has changed its channel (NR-U), the STA reports a change in block 504 in the Wi-Fi channel or cellular frequency to a CCIA function operating in the STA. It should be noted that all of the peer STAs need not be associated with the AP. In this case, only the STA that is requesting the TXOP provides the interference report to AP.

In block 506, the STA receives a set of RUs from the AP deemed safe for P2P communication by the STA.

In block 508, the STA operates, according to option 1, with the received set of RUs.

In block 514, the STA moves, according to option 2, to a different AP.

In block 510, if the STA operates with the RUs assigned by the AP, the STA determines whether feedback on interference to the assigned RUs is allowed. If so, in block 512, the STA sends the feedback to the AP regarding the success of P2P communication using the assigned RUs. The feedback mechanism allows the STA to avoid using the CS/CCA feature, which leads to poor performance. In one embodiment, the STA moves to a different AP in response to the feedback.

Figure 6:
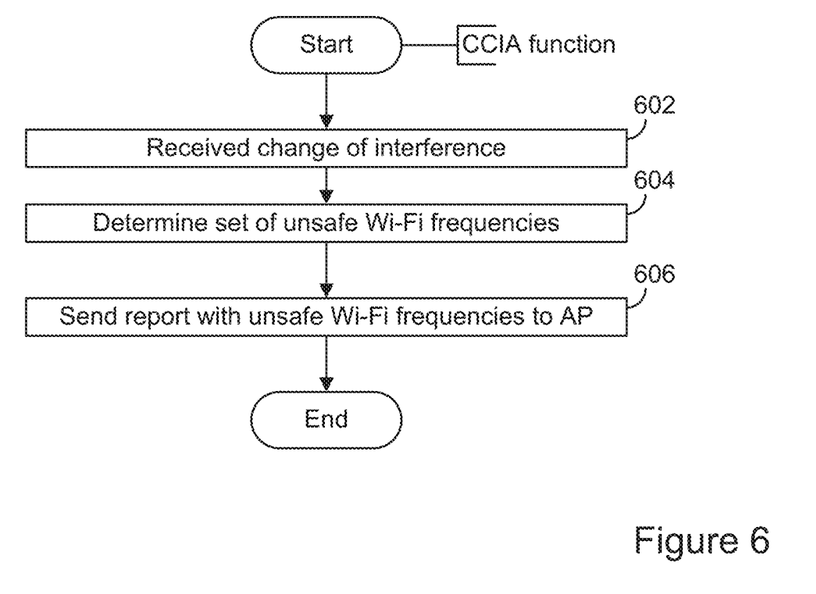
FIG. 6 depicts a flow of operations of a Coexisting Channel Interference Avoidance (CCIA) function, in an embodiment.

FIG. 6 depicts a flow of operations of a CCIA function, in an embodiment. In block 602, the CCIA function receives notice of a change in interference from a STA. In block 604, the function calculates the interference between the cellular and Wi-Fi channels to determine a set of unsafe Wi-Fi frequencies, i.e., frequencies with too much interference to be safely used. In block 606, the function reports the unsafe Wi-Fi frequencies to the AP.

Thus, by receiving information from a STA affected by interference that the AP cannot detect, the AP can respond with an assignment of RUs that avoid interference when the STA communicates directly with another STA. The RUs to which the STA was previously assigned can be reassigned to other STA not affected by the interference.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments, and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer-readable medium(s) having computer-readable program code embodied thereon.

Program code embodied on a computer-readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer-readable medium that can direct a computer, other programmable data processing apparatus, or other device to function in a particular manner, such that the instructions stored in the computer-readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer-implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method for managing interference in a Wi-Fi network, the method comprising:
   evaluating at an access point a severity of detected interference based on a report by at least one station regarding detected interference on a channel of the Wi-Fi network; and
   determining, based on the severity of the detected interference, a set of resource units (RUs) to allocate to a transmission opportunity (TXOP) for peer-to-peer (P2P) communication between a first station and a second station, the set of RUs being those that avoid the detected interference for the allocated TXOP.

2. The method of claim 1, further comprising informing the first and second stations of the set of RUs.

3. The method of claim 1, further comprising receiving feedback from the first station on success of the allocated TXOP.

4. The method of claim 3, further comprising moving the first station and the second station from a first access point to a second access point in response to the feedback.

5. The method of claim 1, wherein the detected interference on the channel is caused by a 5G cellular system transmission operating in an unlicensed band.

6. The method of claim 1, wherein determining the set of RUs includes determining a set of unsafe frequencies.

7. The method of claim 6, wherein the set of unsafe frequencies includes a list of channels in use by the first station or the second station.

8. The method of claim 6, wherein the set of unsafe frequencies includes a list of channels not in use by the first station or the second station.

9. An access point configured to manage interference in a Wi-Fi network, the access point comprising:
   a processor; and
   a memory coupled to the processor and having loaded therein a program designed to:
      evaluate a severity of the interference based on a report by at least one station regarding detected interference on a channel of the Wi-Fi network; and
      determine, based on the severity of the detected interference, a set of resource units (RUs) to allocate to a transmission opportunity (TXOP) for peer-to-peer (P2P) communication between a first station and a second station, the set of RUs being those that avoid the detected interference for the allocated TXOP.

10. The access point of claim 9, wherein the program is further designed to inform the first and second stations of the set of RUs.

11. The access point of claim 9, where the program is further designed to receive feedback from the first station on success of the allocated TXOP.

12. The access point of claim 11, wherein the program is further to designed to move the first station and the second station from a first access point to a second access point in response to the feedback.

13. The access point of claim 9, wherein the detected interference on the channel is caused by a 5G cellular system transmission operating in an unlicensed band.

14. The access point of claim 9,
wherein the program being designed to determine the set of RUs includes being designed to determine a set of unsafe frequencies; and
wherein the set of unsafe frequencies includes a list of channels in use by the first station or the second station.

15. A non-transitory computer-readable medium encoding instructions, which, when executed by a processor of an access point coupled to a wireless medium, cause the access point to:
evaluate at the access point a severity of detected interference based on a report by at least one station regarding detected interference on a channel of a Wi-Fi network; and
determine, based on the severity of the detected interference, a set of resource units (RUs) to allocate to a transmission opportunity (TXOP) for peer-to-peer (P2P) communication between a first station and a second station, the set of RUs being those that avoid the detected interference for the allocated TXOP.

16. The non-transitory computer-readable medium of claim 15, wherein the instructions further cause the access point to inform the first and second stations of the set of RUs.

17. The non-transitory computer-readable medium of claim 15, wherein the instructions further cause the access point to receive feedback from the first station on success of the allocated TXOP.

18. The non-transitory computer-readable medium of claim 17, wherein the instructions further cause the access point to move the first station and the second station from a first access point to a second access point in response to the feedback.

19. The non-transitory computer-readable medium of claim 15, wherein the detected interference on the channel is caused by a 5G cellular system transmission operating in an unlicensed band.

20. The non-transitory computer-readable medium of claim 15,
wherein causing the access point to determine the set of RUs includes causing the access point to determine a set of unsafe frequencies; and
wherein the set of unsafe frequencies includes a list of channels in use by the first station or the second station.

* * * * *